United States Patent Office 2,715,137
Patented Aug. 9, 1955

2,715,137

PRODUCTION OF NITRILES

Harry B. Copelin, Niagara Falls, N. Y., assignor to E. I. du Pont de Nemours and Company, Wilmington, Del., a corporation of Delaware No Drawing. Application November 19, 1952, Serial No. 321,510

22 Claims. (Cl. 260—465.8)

This application relates to the production of nitriles and more particularly to the reaction between a metal cyanide and an organic halide to produce a nitrile. It is a continuation-in-part of application Serial No. 251,140, filed October 12, 1951, now abandoned.

Heretofore nitriles have been produced by reacting organic halides with metal cyanide in non-aqueous media. In such reactions the best results generally have been obtained by selecting as the medium or solvent for the reaction an organic liquid which has considerable solvent power for the metal halide. For example, in producing nitriles by reacting organic halides with an alkali metal cyanide such as sodium cyanide, the preferred reaction solvents have been alcohols or ether-alcohols, liquids which dissolve the organic halides and also the alkali metal cyanide to a considerable extent. Such solvent media for the nitrile-forming reaction are disclosed for example in Macallum U. S. P. 2,211,240 and Rogers U. S. P. 2,415,261.

The above-mentioned Rogers patent discloses, among other things, the production of adiponitrile by reaction of 1,4-dichlorobutane with sodium cyanide in an ether-alcohol as reaction medium. This process for producing adiponitrile results in yields which are good but nevertheless limited by the by-product tars and ethers formed.

An object of this invention is, therefore, to provide an improved method for the production of a nitrile by the reaction of an organic halide with a metal cyanide. A further object is to provide an improved liquid medium for carrying out such reaction. A still further object is to provide an improved process for the production of adiponitrile and other saturated aliphatic dinitriles by the reaction of an alkali metal cyanide with the corresponding saturated aliphatic dihalides or saturated aliphatic cyanohalides. Still other objects will be apparent from the description of the invention.

The above-stated objects may be attained in accordance with the present invention by reacting a metal cyanide with an aliphatic organic compound containing at least one halogen atom of atomic weight not less than 35 and having not more than two of such halogen atoms linked to a single carbon atom, at least one of said halogen atoms being linked to a non-tertiary carbon atom, in a liquid reaction medium initially containing not less than about 20%, and preferably 40%, by weight of a dialkyl amide of a fatty acid. The dialkyl amide, which serves as reaction solvent, has an effect on the course of the reaction, increasing the yield of nitrile and decreasing the amount of non-nitrile by-products. Suitable solvents are the N-dialkyl amides of formic, acetic and propionic acids which have not more than two carbon atoms in each N-alkyl radical.

The invention is illustrated by the following examples:

Example 1

Chlorotrimethyl acetonitrile, 356 g., sodium cyanide, 160 g., sodium iodide, 16 g., and methyl "Cellosolve" (monomethyl ether of ethylene glycol), 300 cc., were charged to a one-liter steel bomb and heated at 200–220° C. for 12 hours. The bomb was cooled, emptied, and the product filtered to remove inorganic salts. Distillation of the filtrate yielded 40 g. (12%) of very crude dinitrile boiling at 110–130° C. at 25 mm.

Example 2

Chlorotrimethyl acetonitrile, 117 g., was added over a 2-hour period to a refluxing mixture of sodium cyanide, 50 g., and dimethyl acetamide, 300 g. After the addition was complete the reaction mixture was refluxed for 2 hours, then cooled and filtered. Distillation of the filtrate at 25 mm. yielded 68 g. (62%) of good quality dinitrile boiling practically all at 125° C. at 25 mm.

Example 3

1,4-dichloro n-pentane, 500 g., was added to a refluxing mixture of methyl "Cellosolve," 1000 cc., and sodium cyanide, 400 g., as rapidly as possible. The reaction mixture was then refluxed for 2 hours. At the end of this time the product was filtered, the cake washed once with methyl "Cellosolve," and the filtrate distilled under reduced pressure. There was recovered 332 g. (72%) of delta-chlorocapronitrile and 87 g. (b. 135–140° C. at 5 mm.) (20%) of alpha methyl adiponitrile.

Example 4

1,4-dichloro n-pentane, 141 g., was added to a refluxing mixture of sodium cyanide, 120 g., and dimethyl formamide, 350 cc., over a one hour period. Refluxing was continued for 2 hours, then the mixture was cooled, filtered, and the cake washed once with methylene chloride. Distillation of the filtrate at 10 mm. pressure yielded 3 g. of chloronitrile (2%) and 102 g. (83%) of alpha methyl adiponitrile, boiling 150–160° C. at 10 mm.

Example 5

γ-Chlorovaleronitrile, 100 g., was added over a ½-hour period to a mixture of 50 g. of sodium cyanide in 300 cc. of dimethyl formamide at reflux temperature. After the addition, the reaction mixture was refluxed for one hour, cooled, and filtered. The cake was sucked dry and the filtrate distilled under reduced pressure. 78 g. (85%) of alpha methyl glutaronitrile (b. 140–145° C. at 20 mm.) was obtained.

Example 6

Methyl "Cellosolve," 2070 g., and 96% sodium cyanide, 1085 g., were mixed and heated to reflux. 1,4-dichlorobutane, 1350 g., was run in with stirring over a 2-hour period, then reflux was continued for 100 minutes. The reaction mixture was cooled, filtered, and the filter cake exhaustively washed with methylene chloride. Vacuum distillation of the filtrate produced 25 g. (2%) of delta-chlorovaleronitrile and 1022 g. (89%) of adiponitrile. Also produced was about 100 g. of tars and by-products boiling between chlorovaleronitrile and adiponitrile.

Example 7

Dimethyl formamide containing 1% water, 2070 g., and 96% sodium cyanide, 1085 g., were heated to reflux under 170 mm. pressure (100° C.). Dichlorobutane (1350 g.) was run in with stirring over a one hour period, then reflux was continued for 120 minutes. The reaction mixture was cooled, filtered, and the filter cake washed thoroughly with methylene chloride. Vacuum distillation of the filtrate produced 52 g. (4.1%) of delta-chlorovaleronitrile and 1063 g. (93.5%) of adiponitrile. The tars and other by-products formed amounted to only 25 g., a 75% reduction as compared with the previous example.

Example 8

2-chlorobutane, 185 g., was added to a refluxing mixture of sodium cyanide, 105 g. (98%), and dimethylacetamide, 500 cc., over a period of three hours. Refluxing was continued for 105 minutes, then the mixture was cooled, filtered, and the cake washed with methylene chloride. Titration of the salt cake for chloride ion showed that 45% of the organic chloride was converted to inorganic chloride. Distillation of the filtrate at 100 mm. pressure yielded 35 g. of 2-methylbutyronitrile (41%), boiling at 58–64° C. at 100 mm.

*Example 9*

2-chlorobutane, 185 g., was added to a refluxing mixture of sodium cyanide, 105 g. (98%), and methyl "Cellosolve," 500 cc., over a period of two hours. Refluxing was continued for two hours, then the mixture was cooled, filtered, and the salt cake washed with methylene chloride. Titration of the salt cake for chloride ion showed that 6.7% of the organic chloride was converted to inorganic chloride. Distillation of the filtrate yielded only the starting material, 2-chlorobutane.

*Example 10*

A series of runs was made by charging sodium cyanide and dichlorobutane into dimethylformamide to determine the lowest concentration of the latter capable of effective performance. Each run was prolonged for two hours. Reference reactions in a mixture containing about 40% by weight of solvent dimethyl formamide show 90–95% conversion of the dichlorobutane to chlorovaleronitrile and adiponitrile in such a period. When the weight of the solvent was reduced to 20% of the total and the temperature of the mixture held at 120–150° C. for two hours, a conversion of only 60% was obtained. At a temperature of 120–150° C. a mixture containing 300 g. of dichlorobutane, 200 g. of sodium cyanide and 5% by weight of solvent showed a conversion of only 30%, the product consisting of 42 g. of chlorovaleronitrile and 27 g. of adiponitrile. In this case no reaction at all was evident after an initial rather violent upsurge in temperature had been checked. Another run made with a solvent comprising only 5% of the mixture but at a temperature of 100° C. gave a quiet steady reaction with a 40% conversion in the allocated two hours. A final run made at 2½% dimethylformamide concentration by weight and at 120°–150° C. gave no further reaction after an introductory spurt with an apparent conversion even smaller than that obtained with 5% solvent. From these experiments it is evident that, in the dichlorobutane cyanation at least, a concentration of dimethylformamide solvent of at least 40% is preferred. A solvent concentration of 20–40% can be utilized but requires more time to achieve a given conversion than does a higher proportion of diluent. Concentrations below about 20% result in impracticably slow reactions and, in addition, seem to favor the replacement of one rather than of two halide ions.

The liquid reaction solvents or reaction media employed in the present invention are the N-dialkyl amides of formic, acetic and propionic acids having not more than two carbon atoms in each N-alkyl radical. These dialkyl amides may be represented by the type formula RCONX$_2$ wherein R represents hydrogen and alkyl radicals having not more than two carbon atoms and X represents alkyl radicals having not more than two carbon atoms. Examples of the N-dialkyl amides are: dimethyl formamide, dimethyl acetamide, diethyl formamide, diethyl acetamide, methyl ethyl formamide, methyl ethyl acetamide, dimethyl propionamide, diethyl propionamide and methyl ethyl propionamide.

The extent to which the benefits of this invention are obtained depends upon the amount of the dialkyl amide present in the reaction mixture. Good results generally may be obtained when the liquid portion of the reaction mixture initially contains from 40 to 95% by weight or more of the dialkyl amide. Concentrations of as low as 20% may be employed if lengthened reaction times are tolerable. Solvent concentration below 20% tends to yield erratic reactions and are not desirable. The initial dialkyl amide concentration may be practically 100%; i. e., the halogen compound may be added to a suspension of cyanide in the dialkyl amide or the two reactants may be simultaneously added to the dialkyl amide. The preferred initial concentration of the dialkyl amide, at which best results usually are obtained, is from about 60 to 95% by weight, or more. Preferably, the dialkyl amide concentration in the liquid portion is maintained at not less than about 20 to 60%, the 40–60% range being preferred throughout the reaction. Either a single dialkyl amide or a mixture of two or more of the dialkyl amides may be utilized, as desired.

While the reaction generally is carried out in the anhydrous condition, small amounts of water generally are beneficial. The best results are obtained by adding from a fraction of 1% up to around 2% by weight of water to the reaction mixture, either before or during the reaction.

While the optimum reaction temperature will vary depending upon the particular organic halide and cyanide reacted, in general the reaction will occur with a satisfactory yield of nitrile within the temperature range of about 20 to 200° C. Generally a reaction temperature of from about 100 to 175° C. is preferred. In most cases the best results are obtained by carrying out the reaction at the atmospheric boiling point of the reaction mixture, i. e., at reflux temperature at atmospheric pressure. In cases where the optimum or desired reaction temperature is above the atmospheric boiling point of the chlorohydrocarbon or of the dialkyl amide used as liquid reaction medium, the reaction may be carried out under superatmospheric pressure sufficient to maintain the components of the reaction mixture in the liquid state. Subatmospheric pressures may be employed, to operate at reflux when the desired reaction temperature is below the atmospheric boiling point of the reaction mixture.

Organic halogen compounds which may be utilized to practice my invention are aliphatic compounds (including those containing cycloaliphatic groups) having one or more halogen atoms of the kind noted below, provided that such halogen atoms are linked to non-tertiary (i. e., primary or secondary) carbon atoms and also provided that not more than two of such halogen atoms are linked to the same carbon atom. I prefer to employ chloro compounds which contain no other halogen.

The organic halogen compound may contain functional groups such as cyano, carboxyl, carboxylate (ester or salt), ether, hydroxyl, keto, aldehydo radicals and the like. Compounds containing carboxyl radicals, which tend to react with alkali metal cyanides, preferably are converted to esters or salts before reacting with the cyanide. Generally the best results are obtained when the organic compound is a halohydrocarbon or a halonitrile.

Suitable organic halogen compounds include halogenated polymeric materials, for example, polyvinyl chloride and polychloroprene, which may be reacted in accordance with my invention to produce polymers containing cyano groups.

While the examples show the reaction of cyanide with organic chlorides, preferred for reasons of economy, the invention is likewise applicable to the reaction of cyanides with the corresponding bromides and iodides. That is, the reactive halogen atom or atoms are those of atomic weight not lower than 35. The presence of fluoride (a halogen atom of atomic weight below 35) in the organic compound will not prevent the cyanation reaction if the compound also contains chlorine, bromine or iodine, but the fluorine atom exhibits little or no reactivity. Accordingly, while my invention is retricted to organic compounds of chlorine, bromine or iodine, I do not exclude such compounds which also contain fluorine.

The reaction of a cyanide with an organic dihalide carried out in accordance with the present invention, for example, the reaction of dichlorobutane to produce adiponitrile, generally occurs in two stages, the first producing the chloronitrile and the second converting the chloronitrile to the dinitrile. Accordingly, the invention may be utilized for reacting a metal cyanide with a chloronitrile to produce a polynitrile.

The known nitrile-forming cyanides, i. e., the metal cyanides generally useful for reacting with organic halogen compounds to produce nitriles, may be utilized in the practice of this invention. These include the alkali metal cyanides, e. g., sodium cyanide and potassium cyanide, or heavy metal cyanides, e. g., cuprous cyanide or zinc cyanide.

Although dimethyl formamide is a poorer solvent for sodium cyanide than is the monomethyl ether of ethylene glycol, employment of the former as reaction medium to react 1,4-dichlorobutane with cyanide results in a distinctly larger yield of adiponitrile and a smaller amount of tarry products and by-product ethers. In addition to the improved yield and decreased by-product in the reaction to produce adiponitrile, the present invention is useful for making many nitriles which are not obtained at all or are obtained only in very poor yield in reactions utilizing conventional solvent media.

I claim:

1. A process for the production of a nitrile which comprises reacting a nitrile forming metal cyanide with an aliphatic organic compound containing at least one halogen atom of atomic weight not less than 35, and having not more than two of said halogen atoms on a single carbon atom, at least one of said halogen atoms being linked to a non-tertiary carbon atom, in a liquid reaction mixture initially containing not less than about 40% by weight of at least one amide selected from the group consisting of the N-dialkyl amides of formic, acetic and propionic acids which contain not more than two carbon atoms in each N-alkyl radical.

2. The process according to claim 1 in which said metal cyanide is an alkali metal cyanide.

3. The process according to claim 2 in which said amide is a dialkyl formamide having not more than two carbon atoms in each N-alkyl radical and the reaction temperature is within the range of about 20 to 200° C.

4. The process according to claim 2 in which said amide is dimethyl formamide and the reaction temperature is within the range of about 20 to 200° C.

5. The process according to claim 2 in which said amide is a dialkyl acetamide having not more than two carbon atoms in each N-alkyl radical and the reaction temperature is within the range of about 20 to 200° C.

6. The process according to claim 2 in which said amide is dimethyl acetamide and the reaction temperature is within the range of about 20 to 200° C.

7. A process for the production of a dinitrile which comprises reacting an alkali metal cyanide with an aliphatic dichloride having chlorine atoms on separate non-tertiary carbon atoms in a liquid reaction mixture initially containing not less than about 40% by weight of at least one amide selected from the group consisting of the N-dialkyl amides of formic, acetic and propionic acids which contain not more than two carbon atoms in each N-alkyl radical, at a temperature of about 20 to 200° C.

8. The process according to claim 7 in which said amide is dimethyl formamide.

9. The process for the production of a nitrile which comprises reacting an alkali metal cyanide with 1,4-dichlorobutane at a temperature of about 100 to 175° C. in a liquid reaction mixture initially containing not less than about 60% by weight of an amide selected from the group consisting of the N-dialkyl amides of formic, acetic and propionic acids which contain not more than two carbon atoms in each N-alkyl group.

10. The process for the production of a nitrile which comprises reacting an alkali metal cyanide with 1,4-dichlorobutane at a temperature of about 100 to 175° C. in a liquid reaction mixture initially containing not less than about 60% by weight of an N-dialkyl formamide having not more than two carbon atoms in each N-alkyl radical.

11. The process for the production of a nitrile which comprises reacting an alkali metal cyanide with 1,4-dichlorobutane at a temperature of about 100 to 175° C. in a liquid reaction mixture initially containing not less than about 60% by weight of dimethyl formamide.

12. The process for the production of a nitrile which comprises reacting an alkali metal cyanide with 1,4-dichlorobutane at a temperature of about 100 to 175° C. in a liquid reaction mixture initially containing not less than about 60% by weight of dimethyl acetamide.

13. The process for the production of a nitrile which comprises reacting an alkali metal cyanide with an aliphatic halonitrile wherein each halogen atom reactive with the cyanide has an atomic weight not less than 35 and is linked to a non-tertiary carbon atom, said nitrile having not more than two of said halogen atoms linked to a single carbon atom at a temperature of about 100 to 175° C. in a liquid reaction mixture initially containing not less than about 60% by weight of an amide selected from the group consisting of the N-dialkyl amides of formic, acetic and propionic acids which contain not more than two carbon atoms in each N-alkyl group.

14. The process of claim 13, wherein said halonitrile is a monochloronitrile and said amide is an N-dialkyl formamide having not more than two carbon atoms in each N-alkyl radical.

15. The process of claim 13, wherein said halonitrile is delta-chlorovaleronitrile and said amide is dimethyl formamide.

16. The process according to claim 7 in which said dichloride is an alpha-omega dichloride of a saturated aliphatic hydrocarbon and said amide is an N-dialkyl formamide having not more than two carbon atoms in each N-alkyl group.

17. The process for the production of a nitrile which comprises reacting an alkali metal cyanide with 1,4-dichlorobutane at a temperature of about 100–175° C. in a liquid reaction mixture containing not less than about 20% by weight of an N-dialkyl amide having not more than two carbon atoms in each N-alkyl radical.

18. The process of claim 17 in which the amide is dimethyl formamide.

19. The process of claim 17 in which the amide is dimethyl acetamide.

20. A process for the production of adiponitrile which comprises reacting 1,4-dichlorobutane with a metallic cyanide in a liquid reaction medium comprising dimethylformamide.

21. The method of producing adiponitrile by replacing both chlorine atoms in 1,4-dichlorobutane with nitrile radicals which comprises reacting said dichlorobutane with a metal cyanide in dimethylformamide at a temperature of between about 100° C. and 175° C.

22. The method of producing adiponitrile by replacing both chlorine atoms in 1,4-dichlorobutane with nitrile radicals which comprises reacting said dichlorobutane with a metal cyanide in a reaction mixture containing between about 20% and 60% of dimethylformamide by weight and at a temperature of between about 100° C. and 175° C.

References Cited in the file of this patent

UNITED STATES PATENTS

| | | |
|---|---|---|
| 2,211,240 | Macallum | Aug. 13, 1940 |
| 2,415,261 | Rogers | Feb. 4, 1947 |
| 2,462,388 | Hager | Feb. 22, 1949 |

FOREIGN PATENTS

| | | |
|---|---|---|
| 333,989 | Great Britain | Aug. 28, 1930 |